(12) United States Patent
Kokubo et al.

(10) Patent No.: US 6,517,979 B1
(45) Date of Patent: Feb. 11, 2003

(54) COATING METHOD, COATING SYSTEM, METHOD OF MANUFACTURING COLOR FILTER SUBSTRATE EMPLOYING THE COATING METHOD, AND LIQUID CRYSTAL DISPLAY DEVICE EMPLOYING THE COLOR FILTER SUBSTRATE MANUFACTURED IN ACCORDANCE WITH THE COATING METHOD

(76) Inventors: Satoshi Kokubo, Kawasaki (JP); Nagato Osano, Kawasaki (JP); Junichi Sakamoto, Yokohama (JP); Kenichi Iwata, Tokyo (JP)

(*) Notice: Subject to any disclaimer, the term of this patent is extended or adjusted under 35 U.S.C. 154(b) by 0 days.

(21) Appl. No.: 09/470,210

(22) Filed: Dec. 22, 1999

(30) Foreign Application Priority Data

Dec. 28, 1998 (JP) .............................. 10-373802

(51) Int. Cl.⁷ .................. G02B 5/20; G02F 1/1335; B05C 5/02; B05C 9/10; B05D 1/26
(52) U.S. Cl. ..................... 430/7; 118/612; 118/712; 349/106; 427/164
(58) Field of Search ................... 430/7; 118/612, 118/712; 349/106; 427/514, 164

(56) References Cited

U.S. PATENT DOCUMENTS

| 5,716,740 A | 2/1998 | Shiba et al. ............... 430/7 |
| 5,817,441 A | 10/1998 | Iwata et al. .............. 430/7 |
| 5,888,679 A | 3/1999 | Suzuki et al. ............. 430/7 |
| 6,042,974 A | 3/2000 | Iwata et al. .............. 430/7 |
| 6,059,880 A | * 5/2000 | Kitano et al. ............ 118/52 |

FOREIGN PATENT DOCUMENTS

| DE | 42 25 618 A1 | * 2/1994 |
| JP | 59-75205 | 4/1984 |
| JP | 8-75916 | 3/1996 |
| JP | 10-099765 A | * 4/1999 |

\* cited by examiner

Primary Examiner—John A. McPherson

(57) ABSTRACT

A coating film is formed on the surface of a member during a coating process wherein a coating head and the member are moved relatively. Mixing plural kinds of coating liquid and supplying the resultant mixed liquid to the coating head are carried out substantially simultaneously. The method is used, for example, in producing a color filter of a liquid crystal display device.

9 Claims, 4 Drawing Sheets

COATING METHOD, COATING SYSTEM, METHOD OF MANUFACTURING COLOR FILTER SUBSTRATE EMPLOYING THE COATING METHOD, AND LIQUID CRYSTAL DISPLAY DEVICE EMPLOYING THE COLOR FILTER SUBSTRATE MANUFACTURED IN ACCORDANCE WITH THE COATING METHOD

BACKGROUND OF THE INVENTION

1. Field of the Invention

The present invention relates in general to a method and a system for coating a coating liquid on the surface of a member to which the coating liquid is to be applied by relatively moving a coating head and the member. In particular, such a method and a system are suitably used when manufacturing a color filter for use in a color television, a personal computer, and the like.

2. Related Background Art

Heretofore, the coloring method, the pigment dispersion method, the electrocoating method, the printing method and the like are well known color filter manufacturing methods. In each of these methods, however, in order to color the three primary colors R, G and B, the same process must be repeated three times. For this reason, since the number of processes is large, the yield is reduced, and the cost is increased.

In addition, in the case of the electrocoating method, the shape of the formable pattern is limited, and hence it is difficult to apply this method to the manufacture of TFTs. In addition, in the case of the printing method, the resolution becomes poor and hence it is difficult to cope with pattern scale down (shrinking).

Then, in order to address the above-mentioned disadvantages, a technology in which an ink jet is jetted onto a glass substrate to form the pattern of the filter (refer to Japanese Patent Application Laid-Open No. 59-75205 and the like) has been proposed. In this technology, since the pixels of three primary colors R, G and B are simultaneously formed, it is possible to greatly shorten the process. However, in this technology, since the primary colors R, G and B are painted in droplets, a phenomenon called color mixing occurs in which the primary colors are mixed with one another.

In order to prevent such color mixing, in Japanese Patent Application Laid-Open No. 8-75916, the layer (the ink acceptable layer) made of resin or resinous composition which has the ink acceptability and which is cured or which has the remaining amount of hydrophilic groups thereof decreased by the application of light, heat or the like thereto is formed on the substrate; at least a part of the non-pixel area defined between the pixels is cured or the remaining amount of hydrophilic groups is decreased to provide ink repellency to form a color mixing preventing layer (the ink repellency layer). In this way, lack of color in the pixels, spreading of the ink to adjacent pixels and color mixing are prevented.

Also, in the process of manufacturing the color filter, in addition to the above-mentioned ink acceptable layer, the protection layer (the over coat layer) for protecting the colored surface, which is made of resin, is also formed. In addition, a photosensitive material which is used to etch a black matrix for higher contrast promotion or a higher degree color when carrying out the display using the color filter is also made of resin. Also, the black matrix itself may be formed of resin (the resin matrix) in some cases.

Now, as for the coating liquid which is used to form such a resin layer or a resin film, normally, a liquid is employed which is obtained by mixing two or more liquid components with one another at a fixed ratio. Heretofore, such a mixed liquid is preliminarily produced on a mass scale taking half a day or a day, for example, and is stored in a coating material tank 41 as shown in FIG. 4 in order to be later supplied from the tank 41 to a member 7 to which the coating liquid is to be applied. In FIG. 4, reference numeral 5 designates a nozzle; reference numeral 6 designates a coating film; reference numeral 7 designates a member to which the coating liquid is to be subjected to a coating; reference numeral 8 designates a carrier stage; reference numeral 41 designates a coating material tank; reference numeral 42 designates a pipeline; reference numeral 43 designates a quantity measuring pump; reference numeral 44 designates a shut-off valve; reference numeral 45 designates a filter; and reference numeral 54 designates a slit.

In this connection, there arises a problem in that the viscosity of the mixed liquid as described above changes with the passage of time, and hence it is difficult to control the thickness of the coating liquid; a gel or the like is typically generated in the coating liquid supplying route, thereby generating coating defects. As a result, cleaning of the route is required at a high frequency, the frequency of the mixing and the frequency of filling the coating material tank 41 with the coating material are both increased due to the limitation of the pot life (the time interval for use), the mixed liquid is wasted and so forth.

SUMMARY OF THE INVENTION

In light of the foregoing, the present invention was made in order to solve the above-mentioned problems associated with the prior art. It is therefore an object of the present invention to promote labor saving and high reliability in coating with a coating liquid which has been obtained by mixing a plurality of different liquids with one another.

In order to solve the above-mentioned problems associated with the prior art, according to one aspect of the present invention, there is provided a coating method in which the coating liquid is discharged on the surface of a member to which the coating liquid is to be applied by moving relatively a coating head and the member to form a coating film, characterized in that the process of mixing plural kinds of coating liquid with one another and the process of supplying the resultant mixed liquid to the coating head are substantially simultaneously carried out.

In addition, according to another aspect of the present invention, there is provided an application system having: a coating liquid supplying apparatus for supplying the coating liquid to a coating head having a slit for discharging therethrough the coating liquid; a stage for holding a member to be coated with the coating liquid; and driving means for moving relatively the stage and the coating head, characterized in that the coating liquid supplying apparatus includes: mixing means for mixing equal to or more than two different coating liquids with one another at a fixed ratio; and mixed liquid supplying means for supplying the resultant mixed liquid to the coating head.

Further, according to still another aspect of the present invention, there is provided a coating system for applying a two liquid mixed type application liquid to the surface of a member to be coated with the coating liquid to form a coating film, characterized in that a coating liquid supplying apparatus includes: first quantity measuring supply means for supplying a first coating liquid from a first tank to mixing means at a first flow rate; second quantity measuring supply means for supplying a second coating liquid from a second tank to the mixing means at a second flow rate; and mixed liquid supplying means for supplying the mixed liquid which has been obtained in the mixing means to a coating head at a third flow rate.

According to the present invention, in coating with the coating liquid which has been obtained by mixing a plurality of different liquids with one another, the process of mixing the liquids can be carried out right before the coating, and hence coating becomes possible without any of the above-described pot life limitations. In addition, it is possible to prevent the generation of gel and the like in the coating liquid supplying route, and also it is possible to prevent any of the coating defects resulting therefrom.

DETAILED DESCRIPTION OF THE PREFERRED EMBODIMENTS

Figure 1:
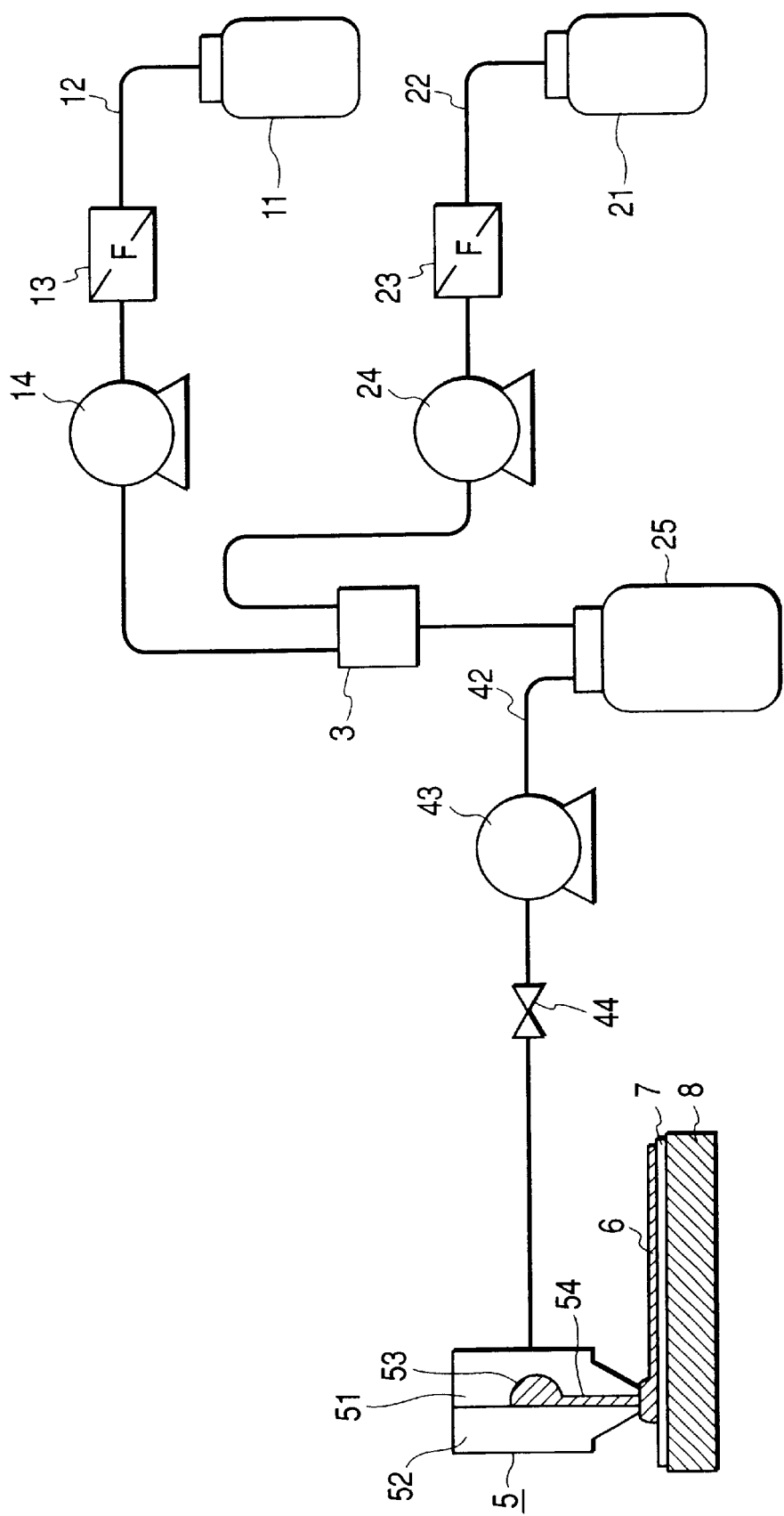
FIG. 1 is a schematic view showing the construction of one example of a coating system according to the present invention.
Figure 2A:
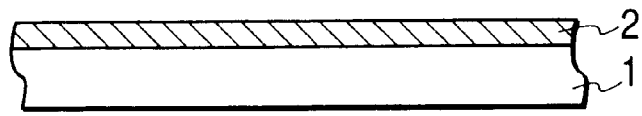
FIGS. 2A, 2B, 2C, 2D and 2E are respectively schematic process views showing one example of a method of manufacturing a color filter substrate according to the present invention.
Figure 2B:
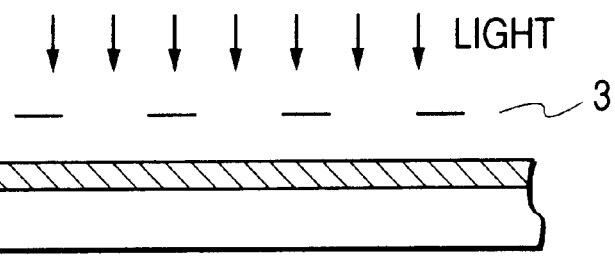
Figure 2C:
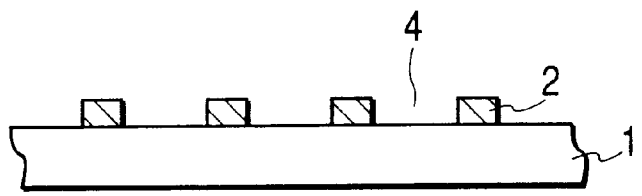
Figure 2D:
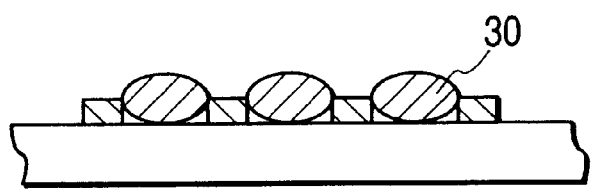
Figure 2E:
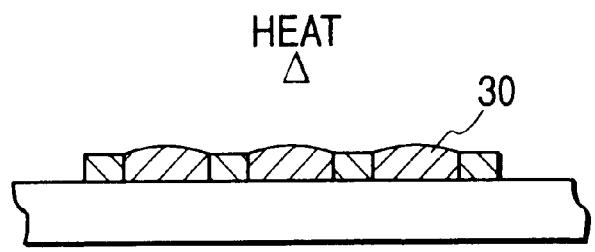

The preferred embodiments of the present invention will hereinafter be described in detail with reference to the accompanying drawings. FIG. 1 is a schematic view showing the construction of one example of a coating system in which a single substrate automatical coating method according to the present invention is implemented. In the figure, the coating materials of the two liquid mixed type are supplied from a coating material tank 11 and a coating material tank 21 by a quantity measuring pump 14 and a quantity measuring pump 24, respectively. Quantity measuring pumps 14 and 24 are typically a capacity pump such as a gear pump, diaphragm pump or a syringe pump. In addition, as for an alternative mechanism for supplying the coating material, it is possible to accommodate the coating material tank in a pressure vessel and then supply pressurized air to the pressure vessel by a pressure pump to press out the coating material. In this connection, the ratio of the flow rate of the liquid which is supplied from the quantity measuring pump 14 to the flow rate of the liquid which is supplied from the quantity measuring pump 24 is held constant.

The coating materials which have been respectively supplied by the quantity measuring pumps 14 and 24 are uniformly mixed with each other in a stirring unit 3. Stirring unit 3 is typically a static mixer having a helical passage, a dynamic mixer of the type in which stirring is carried out by a rotating gear, or the like. In addition, filters 13 and 23 are respectively provided in the passages of the pipelines 12 and 22 which extend from the coating material tanks 11 and 21 to the quantity measuring pumps 14 and 24, respectively. Further, a shut-off valve may be provided therein if necessary.

The liquid which has been obtained by the uniform mixing is temporarily stored in a reservoir tank 25 through the stirring unit 3. Then, the liquid is supplied to the nozzle 5 by a quantity measuring pump 43. But, in addition thereto, it is also possible to directly supply the mixed coating material to the quantity measuring pump 43 or to directly supply the mixed coating material from the stirring unit 3 to the nozzle 5. In this connection, even in the case where the mixed coating material is directly supplied, when stopping the supply of the mixed coating material at the end portion of the member to which the coating liquid is to be applied, and so forth, it is preferable that the above-mentioned reservoir tank 25 is connected as a buffer tank in which the mixed coating material flowing out from the stirring unit 3 is temporarily stored. In addition, while the coating material tank 41, which is employed in order to store therein the mixed liquid in the conventional application system shown in FIGS. 2A to 2E, may be directly employed as the reservoir tank 25, a smaller capacity tank is also acceptable.

If necessary, a shut-off valve 44 is provided in the passage of a pipeline 42 extending from the reservoir tank 25 to the nozzle 5.

The nozzle 5 having a front lip 51 and a rear lip 52 is provided with a coating material supply port and a manifold 53 for making uniform the pressure distribution of the coating material while the coating material flows from the coating material supply port to a coating material slit 54. In this connection, the slit gap (the gap defined between the front lip 51 and the rear lip 52) of the slit 54 is preferably in the range of 10 to 200 $\mu$m.

The nozzle 5 is installed in such a way as to face the member 7 to be coated with the coating liquid through a fixed gap (the clearance). The size of the clearance is preferably in the range of 20 to 500 $\mu$m.

The member 7 to be coated with coating liquid is placed on a flat carrier stage 8 and is vacuum-sucked on the carrier stage 8 in order to be prevented from slipping out of place during the coating process.

Supply of the coating material to the nozzle 5 is begun via the quantity measuring pump 43, and without delay or after a lapse of predetermined time, the nozzle 5 or the carrier stage 8 is moved in parallel. Right before the nozzle 5 or the carrier stage 8 has reached the end portion of the member to be coated with the coating liquid, the supply of the coating material from the quantity measuring pump 43 is stopped, and the movement of the nozzle 5 or the carrier stage 8 is also stopped. In such a way, coating of a thin film having the uniform thickness distribution is carried out.

The coating method the present invention is suitably applied to a process of manufacturing a color filter which is a constituent member of a liquid crystal display device of the color display type. In general, in the color filter, a light shielding layer which is made of black metal or black resin called the black matrix or the black stripe, a coloring layer in which each of the opening portions of the light shielding layer is utilized as the colored pixel and which has the colored pixels of three primary colors R(red), G(green) and B(blue), and a protection layer, which may be provided if necessary, are formed in this order on a transparent substrate. Therefore, the coating system according to the present invention is applied to the coating and the formation of the light shielding layer, the coloring layer and the protection layer or the application of resist which is used in the patterning of those coating films, whereby it is possible to form a coating film which is wide in effective area and which is uniform in thickness. In this way, an excellent color filter can be formed with high yield.

For example, the color filter can be manufactured on the basis of a series of processes as shown in FIGS. 2A to 2E. In this connection, FIGS. 2A to 2E correspond to the following processes (a) to (e), respectively.

(a) A black photosensitive resinous composition 2 is applied onto a transparent substrate 1 in accordance with the coating method of the present invention. The thickness of the film which has been obtained by the coating is enough to obtain the necessary light shielding property and is, for example, about 1 μm. In this connection, while for the transparent substrate, for example, glass is employed in many cases, alternatively, a plastic film or a plastic sheet may also be employed therefore. In addition, for the purpose of improving the adhesion between the transparent substrate and the black matrix and the coloring ink, if necessary, a thin film for improving adhesion may also be previously formed on the transparent substrate.

(b) The resultant layer which has been obtained by the application is temporarily cured using a hot plate, for example, and is then exposed using an exposure apparatus which has a wavelength matching the sensitivity of the photosensitive resinous composition and a mask 3 having a predetermined pattern formed thereon.

(c) By carrying out the development, if the photosensitive resinous composition 2 is of the negative type, then the portion which was shielded from light by the mask 3 during the exposure is eluded by a liquid developer to expose the corresponding surface portion of the substrate so that the exposed portion remains in the form of the black matrix pattern. Subsequently, the liquid developer adhered to the coating layer is washed away using the rinse. Then, the coating layer is simply dried by utilizing spin drying, air knife or the like. As a result, the surface of the substrate having the gap portions 4 of the black matrix formed thereon becomes a clear surface.

(d) An ink 30 having a predetermined color is applied to each of gap areas 4 of the black matrix. As for the method of applying the ink, while a general printing method or the like such as offset printing, gravure printing or screen printing may be employed, in particular, an ink jet printing method using an ink jet printing machine is preferable since no plates are used during the printing and if the diameter of the ink droplet is controlled, then the patterning can be carried out with high accuracy. As for the ink which is used in this process, an ink that is easy to be shed on the above-mentioned black matrix pattern, but also easy to be wet in each of the pixel areas in the gap of the black matrix is suitably selected. In general, the surface energy (the surface tension) is in the range of 30 to 70 dyne/cm. Such an ink may be of either the dry series or the pigment series and also may contain a hydrophilic organic solvent or the like with water as the main component.

Employing a thermosetting ink as the ink is preferable in that curing of the ink and the main curing of the black matrix can be carried out in the same process.

As for the thermosetting component which is contained in the ink, such a material is preferable that is cured under substantially the same temperature conditions as those of the main curing of the black matrix, and hence is suitably selected from the group consisting of acrylic resin, epoxy resins, phenolic resins, entiore and the like. In addition, an ink may also be employed in which, in accordance with the required process temperature, aromatic amine, acid anhydride or the like is introduced into a resin as described above.

(e) The heat drying treatment (the post-baking) is executed in order to maincure the black matrix to form the black matrix. At this time, the main curing of the ink is also preferably carried out. Thereafter, if necessary, the protection film is formed using the coating system of the present invention.

Figure 3:
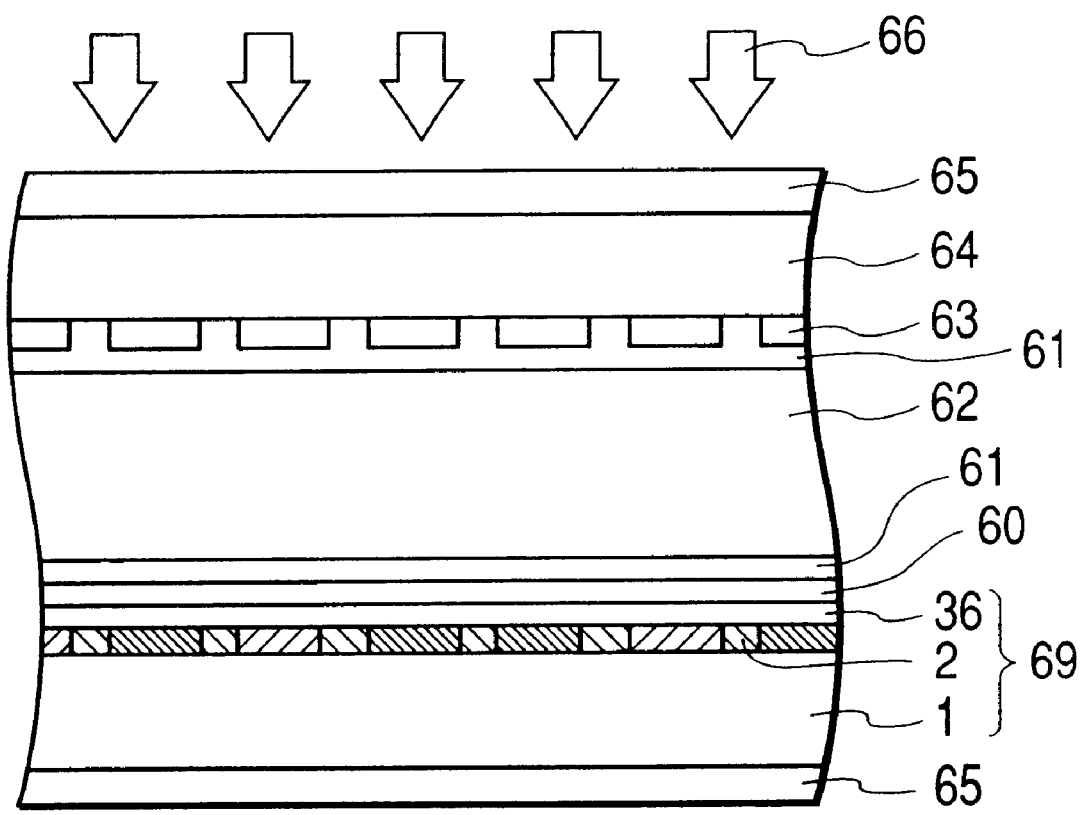
FIG. 3 is a cross-sectional view showing one example of a liquid crystal display device according to the present invention.

FIG. 3 is a cross-sectional view showing the structure of a TFT color liquid crystal panel in which the color filter is incorporated which is manufactured in accordance with the coating method of the present invention. In this connection, it is to be understood that the form thereof is not limited to the present example.

In general, the color liquid crystal panel is formed so that the color filter substrate 1 and a counter substrate 64 are arranged in such a way as to face each other and then the space defined between the substrates 1 and 64 is filled with a liquid crystal composition 62. The TFTs (not shown) and transparent pixel electrodes 63 are both formed in a matrix on the inner portion of one substrate 64 of the liquid crystal panel. On the other hand, a color filter substrate 69 is arranged in the inner portion of the other substrate 1 in such a way that the color materials of R, G and B are arranged in the positions opposite to the pixel electrode, and a transparent opposing electrode (a common electrode) 60 is formed on the whole surface thereof. In general, the black matrix is formed on the side of the color filter substrate. In addition, orientation films 61 are formed on the surfaces of both of the substrates facing each other, and they are subjected to a rubbing process, thereby enabling the liquid crystal molecules to be oriented in a fixed direction. In addition, polarizing plates 65 are adhered to the outer surfaces of the glass substrates, respectively, and as described above, a gap (in the range of about 2 to about 5 μm) defined between those glass substrates is filled with the liquid crystal compound 62. In addition, as for a back light, in general, the combination of a fluorescent lamp (not shown) and a scattering plate (not shown) is employed. Then, the liquid crystal compound is made to act as an optical shutter for changing the transmissivity of the back light, thereby achieving the display. In the figure, reference numeral 36 designates a protection layer which is formed if necessary.

EMBODIMENTS

The preferred embodiments of the present invention the comparative examples therewith will hereinafter be described in detail.

EMBODIMENT 1

SS-6699G (the main agent) as two liquid curing type resin and SS-0699G as its curing agent (both of them are manufactured by JSR) are adopted as the coating material, and the substrate on which three-layer low reflective chromium film is formed on the whole surface of a no-alkali glass substrate 1733 (manufactured by Corning Co., Ltd.) of 360 mm×465 mm×0.7 mm is employed as the member to which the application liquid is to be applied. The coating is carried out using the coating system having the construction as shown in FIG. 1.

As each of the quantity measuring pumps 14, 24 and 43, a high accuracy diaphragm pump is employed. A dynamic mixer employing a gear is employed as the stirring unit 3. Also, for the driving of the substrate carrier stage 8, a high accuracy servo motor is adopted.

The above-mentioned SS-6699G and SS-0699G are stored in the coating material tank 11 and the coating material tank 21, respectively, and the liquid feeding passage extending up to the nozzle 5 is previously filled with the mixed coating material.

The flow rate of the quantity measuring pump 14 and the flow rate of the quantity measuring pump 24 are respectively set to 61.4 μl/sec and 12.7 μl/sec, and the volume ratio of the main agent to the curing agent is maintained at 29:6.

In addition, the capacity of the reservoir tank is set to 50 ml, and the liquid surface sensors (not shown) are provided in the position near the level of 20 ml and the position of the level of 50 ml, respectively. Then, when the amount of mixed coating material in the reservoir tank has been decreased down to the level of 20 ml, the supply of the coating materials by the quantity measuring pumps 14 and 24 is restarted, and the amount of mixed coating material in the reservoir tank has reached the level of 50 ml, the supply of the mixed coating materials thereby is stopped.

The slit gap is set to 30 μm, and the distance (the clearance) between the tip of the nozzle and the surface of the member to be coated with the coating liquid is set to 50 μm. In addition, for the purpose of preventing the mixed coating material from being spread up the side face and the rear face of the member 7 to which the application liquid is to be applied, the crossing width of the discharge opening of the slit tip is set to 356 mm.

The discharge rate is set in such a way that the substrate carrying speed is 52 mm/sec, and the flow rate of the quantity measuring pump 43 is 74.1 μl/sec. The coating is carried out in such a way that the point of starting the coating and the point of completing the coating fall within 1.0 mm of the end portion of the substrate. After the resultant substrate to which the coating liquid was applied has been dried for 20 minutes in the oven the temperature of which is held at 90° C., the baking is carried out for 60 minutes in the oven at a temperature of 230° C. to obtain the coating film 6.

Both of the coating material tanks 11 and 21 are filled with the new coating material, and the coating is continuously carried out at intervals of 1 minute in accordance with the above-mentioned coating method. Then, for 24 hours right after having supplied the new liquid, the substrate to which the coating liquid has been applied is pulled out every 4 hours, and then the number of particles lying on the substrate is measured using the particle counter GI-4700 manufactured by Hitachi Electronics Engineering Co., Ltd. In this connection, for each of those substrates thus pulled out, the number of particles lying thereon is previously measured on the basis of the same measuring method before having been charged to the coating system. Then, the number of particles which are considered to be generated in the coating process is measured on the basis of the difference between the two particle measurement results. In this connection, the of the particle to be measured is in the range of equal to or larger than 1 μm to smaller than 5 μm in diameter. These measurement results are shown in Table 1.

EMBODIMENT 2

A no-alkali glass substrate 1737 (manufactured by Corning Co., Ltd.) of 360 mm×465 mm×0.7 mm is employed as the member to be coated with the coating liquid, and SS-6699G (the main agent) as two liquid curing type resin and SS-0699G as its curing agent (both of them are manufactured by JSR) are adopted as the coating material similar to Embodiment 1, and hereinafter, the coating film 6 is obtained utilizing the same coating method as that in Embodiment 1.

For 24 hours right after having supplied the new liquid, the substrate coated with the coating liquid is pulled out every 4 hours, and then the thickness of the coating film is measured at nine points within the substrate using the tracer method type film thickness measuring apparatus FP-20 manufactured by Tencall Co., Ltd. The measurement results are shown in Table 2 with the mean value of the film thickness at nine points as the central value.

EMBODIMENT 3

A photosensitive resinous composition made of acrylate series polymer as will hereinbelow be shown is applied to the glass substrate having the black matrix formed thereon to form a resin layer.

More specifically, after the coating with the photosensitive resinous composition using the spin coater, the pre-bake processing is carried out for 20 minutes at 90° C. to form the photosensitive resin layer with 1 μm film thickness.

| Photosensitive resinous composition | |
|---|---|
| Methyl methacrylate | 5.0 parts by weight |
| Hydroxy methyl methacrylate | 3.0 parts by weight |
| Ternary copolymer made of N-methylol acrylamide | 2.0 parts by weight |
| Triphenyl sulfonium trifluorate (TPS-105 manufactured by Midori Chemistry Co. Ltd.) | 0.3 parts by weight |
| Ethyl cellosolve | 89.7 parts by weight |

Next, a part of the resin layer formed on the black matrix is exposed with an exposure of 1 J/cm² through a photo mask having an opening portion which is narrower than the width of the black matrix to form the predetermined pattern. In addition, the unexposed portion of the resin layer is colored R, G and B with the dye inks having the following composition using the ink jet recording apparatus to form the matrix pattern of R, G and B.

| Ink composition | |
|---|---|
| Dye | 5 parts by weight |
| Ethylene glycol | 10 parts by weight |
| Isopropyl alcohol | 3 parts by weight |
| Ion exchange water | 82 parts by weight |
| Dye R: C. I. Acid Red | 118 |
| G: C. I. Acid Green | 25 |
| B: C. I. Acid Blue | 113 |

In addition, the inks are dried for 5 minutes using the hot plate at 90° C., and then the process of curing the resin layer is executed in the oven at 230° C.

Next, thermosetting resin of two liquid type SS-6699G (manufactured by JSR) is formed in the form of the over coat layer by utilizing the method which was described in Embodiment 1.

As a result of observing the color filter for the liquid crystal panel thus manufactured using the optical microscope, faults such as color mixing, color shade and color lack are not observed at all.

In addition, as a result of manufacturing the liquid crystal panel employing the color filter to drive the resultant liquid crystal panel, the color display can be achieved out with high definition.

COMPARATIVE EXAMPLE 1

Figure 4:
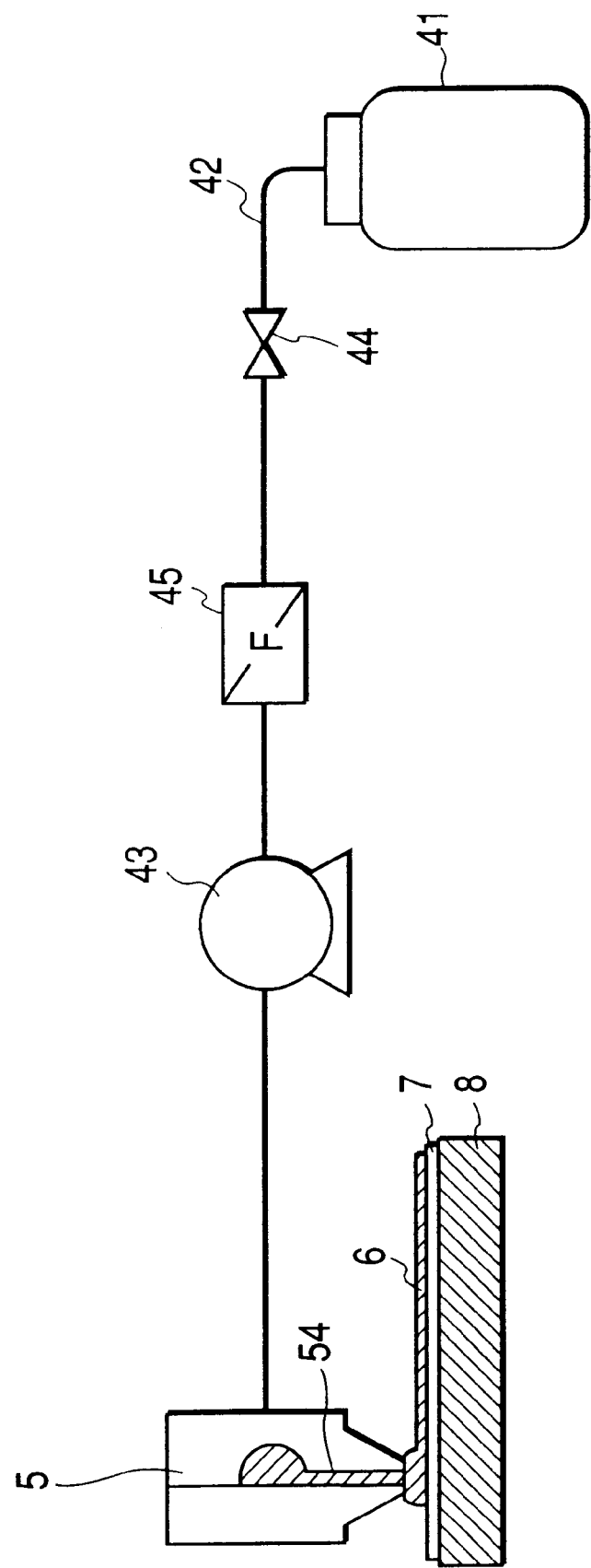
FIG. 4 is a schematic view showing the construction of a conventional coating system.

SS-6699G (the main agent) as two liquid curing type resin and SS-0699G as its curing agent (both of them are manufactured by JSR) are adopted as the coating material, and the substrate in which a three-layer low reflective chromium film is formed on the whole surface of a no-alkali glass substrate 1737 (manufactured by Corning Co., Ltd.) of 360 mm×465 mm×0.7 mm is employed as the member to which the coating liquid is to be applied. The coating is carried out using the coating system having the construction as shown in FIG. 4. As for the quantity measuring pump 43, a high accuracy diaphragm pump is employed. For the driving of the substrate carrier stage 8, a high accuracy servo motor is adopted. The above-mentioned SS-6699G and SS-0699G are uniformly mixed with each other at the volume ratio of 29:6, and then the resultant is stored in the coating material tank 41 and also the liquid feeding passage extending up to the nozzle 5 is previously filled with that coating material. In addition, the slit gap is set to 30 $\mu$m, and the distance (the clearance) between the tip of the nozzle and the surface of the member to which the coating liquid is to be applied is set to 50 $\mu$m. Also, for the purpose of preventing the coating material from spreading up the side face and the rear face of the member to be coated with the coating liquid, the crossing width of the discharge opening of the slit tip is set to 356 mm.

The substrate carrying speed is set to 52 mm/sec, and the flow rate, i.e., the discharge rate of the quantity measuring pump 43 is set to 74.1 $\mu$l/sec, and also the starting point and the end point of the coating fall within 1.0 mm from the end portion of the substrate by 1.0 mm. In such a way, the coating is carried out. Then, after the resultant substrate to which the coating liquid was applied has been dried for 20 minutes in the oven at 90° C., the baking is further carried out for 60 minutes in the oven at 230° C. to obtain the coating film 6.

The coating material tank 41 is filled with the new coating material, and the coating is continuously carried out at intervals of 1 minute in accordance with the above-mentioned coating method. Then, for 24 hours right after having supplied the new liquid, the substrate to which the coating liquid was applied is pulled out every 4 hours. Then the number of particles lying on the substrate is measured using the particle counter GI-4700 manufactured by Hitachi Electronics Engineering Co., Ltd. In this connection, for each of the substrates thus pulled out, the number of particles thereon is also previously measured in accordance with the same measuring method before having been charged to the application system. Then, the number of particles which are considered to be generated in the coating process is measured on the basis of the difference between the two particle measurement results. In this connection, the object of the particle to be measured is in the range of equal to or larger than 1 $\mu$m to smaller than 5 $\mu$m.

The results of the measurement are shown together with the results of the measurement in Embodiment 1 in Table 1.

TABLE 1

|  | Embodiment 1 Number of Particles | | | Comparative Example 1 Number of Particles | | |
| --- | --- | --- | --- | --- | --- | --- |
| Elasped Time | Before Appl. | After Appl. | Appl. Process | Before Appl. | After Appl. | Appl. Process |
| 0 | 134 | 149 | 15 | 134 | 149 | 15 |
| 4 | 76 | 82 | 6 | 76 | 94 | 18 |
| 8 | 178 | 199 | 21 | 178 | 201 | 23 |
| 12 | 112 | 128 | 16 | 112 | 145 | 33 |
| 16 | 146 | 157 | 11 | 146 | 211 | 65 |
| 20 | 98 | 121 | 23 | 98 | 143 | 45 |
| 24 | 165 | 177 | 12 | 165 | 234 | 69 |

Considering the above-mentioned measurement results, it becomes clear that in the case of the present comparative example, the number of particles tends to increase with the passage of time, after having supplied the new liquid. On the other hand, in the case of Embodiment 1, the mixing is carried out at any time to keep the passage of time after mixing to a minimum, whereby it is possible to reduce the generation of particles in the application process.

COMPARATIVE EXAMPLE 2

A no-alkali glass substrate 1737 (manufactured by Corning Co., Ltd.) of 360 mm×465 mm×0.7 mm is employed as the member to which the application liquid is to be applied, and SS-6699G (the main agent) as two liquid curing type resin and SS-0699G as its curing agent both of them are manufactured by JSR) are adopted as the coating material similar to Comparative Example 1. The coating film is obtained in accordance with the same coating method as that in Embodiment 1.

For 24 hours right after the new liquid has been applied, the substrate coated with the coating liquid is pulled out at intervals of 4 hours, and the thickness of the coating film is measured at nine points in the substrate using the tracer method type film thickness measuring apparatus FP-20 manufactured by Tencall Co., Ltd. The results of the measurement are shown together with the results of the measurement in Embodiment 1 in Table 2 with the mean value of the film thickness at nine points as the central value.

TABLE 2

| Elapsed Time | Embodiment 2 Film Thickness | Comparative Example 2 Film Thickness |
| --- | --- | --- |
| 0 | 1.09 $\mu$m | 1.09 $\mu$m |
| 4 | 1.07 $\mu$m | 1.08 $\mu$m |
| 8 | 1.08 $\mu$m | 1.10 $\mu$m |
| 12 | 1.07 $\mu$m | 1.10 $\mu$m |
| 16 | 1.09 $\mu$m | 1.13 $\mu$m |
| 20 | 1.07 $\mu$m | 1.11 $\mu$m |
| 24 | 1.09 $\mu$m | 1.14 $\mu$m |

Considering the above-mentioned measurement results, it becomes clear that in the case of the present comparative example, the film thickness tends to increased with the passage of time after having supplied the new liquid. On the other hand, in the case of Embodiment 2, mixing is carried out at any time to keep the passage of time after mixing to a minimum, whereby the film thickness is not substantially changed with time and hence the coating is carried out stably.

In this connection, while in the foregoing, the description has been made with respect to the specific case where the present invention is mainly used in the process of manufacturing the color filter, it is to be understood that the present invention can also be applied when each of the overall coating materials which are limited by pot life (the time interval for the use), such as the photoresist for use in the manufacture of the semiconductor devices, is applied.

As set forth hereinabove, according to a coating system and a coating method of the present invention, in the coating with the coating liquid, such as the over coat liquid for the color filter, which is obtained by mixing a plurality of different liquids with one another, the mixing of the liquids can be carried out right before the coating. Hence, the application can be carried out without any of the limitations for pot life of the coating liquid. In addition, it is possible to prevent the generation of gel and the like in the coating liquid supplying passage, and hence any of the coating defects resulting therefrom can be prevented.

Further, if the coating method or the coating system according to the present invention is applied to the manufacture of the color filter, then the operation rate of the equipment can be enhanced and also the color filters which are excellent in quality can be manufactured with high yield.

What is claimed is:

1. A method of coating a mixed coating liquid on a surface of a member comprising the steps of:

admixing plural kinds of coating liquids which harden upon admixture;

supplying the resultant mixed liquid to a coating head;

moving relatively the coating head and said member to form a coating film on said surface; and monitoring quantity of the resultant mixed liquid for controlling quantity of the plural kinds of coating liquids so as to limit the quantity of the resultant mixed liquid to a level not greater than a predetermined level, wherein the plural kinds of coating liquids are admixed and the resultant mixed liquid is supplied to said coating head substantially simultaneously.

2. A method of manufacturing a color filter substrate comprising the steps of:

applying a photosensitive resinous composition in accordance with said method of coating as defined in claim 1;

patterning said photosensitive resinous composition to form a black matrix pattern; and applying coloring inks to a gap of said black matrix.

3. A liquid crystal display device comprising:

a color filter substrate which is manufactured in accordance with claim 2, a counter substrate which is arranged in such a way as to face said color filter substrate; and a liquid crystal composition sandwiched between said color filter substrate and said counter substrate.

4. The method of coating a mixed coating liquid according to claim 1, wherein the plural kinds of coating liquids are a two-liquid-hardening-type resin and a hardening substance.

5. A coating system comprising:

a coating liquid supplying apparatus for supplying a coating liquid to a coating head having a slit for discharging therethrough the coating liquid;

a stage for holding a member to be coated with the coating liquid; and driving means for moving relatively said stage and said coating head, wherein said coating liquid supplying apparatus comprises:

mixing means for admixing at least two different coating liquids, which harden upon admixture, at a fixed ratio;

mixed liquid supplying means for supplying the resultant mixed liquid to said coating head; and means for monitoring quantity of the resultant mixed liquid for controlling quantity of the at least two different coating liquids so as to limit the quantity of the resultant mixed liquid to a level not greater than a predetermined level.

6. The coating system according to claim 5, wherein the at least two different kinds of coating liquid are a two-liquid-hardening-type resin and a hardening substance.

7. A coating system for applying a coating liquid, which is a mixture of a first and a second coating liquid, to the surface of a member to form a coating film comprising:

first supply means for supplying the first coating liquid from a first tank to mixing means at a first flow rate;

second supply means for supplying the second coating liquid from a second tank to said mixing means at a second flow rate, whereby the first and second coating liquids, which harden upon admixture, are admixed;

mixed liquid supplying means for supplying the mixed liquid which has been obtained in said mixing means to a coating head at a third flow rate; and means for monitoring quantity of the resultant mixed liquid for controlling quantity of the first and second coating liquids so as to limit the quantity of the resultant mixed liquid to a level not greater than a predetermined level.

8. A coating system according to claim 7, further comprising a buffer tank for temporarily storing the mixed liquid therein, wherein said mixed liquid supplying means supplies the mixed liquid from said buffer tank to said coating head.

9. The coating system according to claim 7, wherein the first and second coating liquids are a two-liquid-hardening-type resin and a hardening substance.

* * * * *

UNITED STATES PATENT AND TRADEMARK OFFICE
CERTIFICATE OF CORRECTION

PATENT NO. : 6,517,979 B1
DATED : February 11, 2003
INVENTOR(S) : Satoshi Kokubo et al.

It is certified that error appears in the above-identified patent and that said Letters Patent is hereby corrected as shown below:

Title page,
Item [76], Inventors:
"[76] Inventors:" should read -- [75] Inventors: --.
Item [73], Assignee, insert -- [73] Assignee: Canon Kabushiki Kaisha, Tokyo (JP) --.
Item [*] Notice, insert -- This patent issued on a continued prosecution application filed under 37 CFR 1.53(d), and is subject to the twenty year patent term provisions of 35 U.S.C. 154(a)(2). --.
Item [74], *Attorney, Agent, or Firm*, insert -- *Attorney, Agent, or Firm* –Fitzpatrick, Cella, Harper & Scinto --.
Item [65], Prior Publication Data,
insert -- [65] Prior Publication Data
    US 2003/0017403 A1 Jan. 23, 2003 --.

Column 1,
Line 34, "poor" should read -- poor, --; and
Line 67, "degree color" should read -- degree of color --.

Column 5,
Line 67, "maincure" should read -- main cure --.

Column 6,
Line 13, "other and" should read -- other, and --;
Line 39, "formed" should read -- formed, --;
Line 42, "invention the" should read -- invention and --; and
Line 50, "which" should read -- which a --.

Column 7,
Line 12, "and" should read -- and when --; and
Line 47, "the of" should read -- the size of --.

Column 8,
Line 57, "out" should be deleted.

Column 9,
Line 8, "tank 41" should read -- tank 41, --; and
Line 22, "substrate by 1.0 mm." should read -- substrate. --.

UNITED STATES PATENT AND TRADEMARK OFFICE
CERTIFICATE OF CORRECTION

PATENT NO.   : 6,517,979 B1
DATED        : February 11, 2003
INVENTOR(S)  : Satoshi Kokubo et al.

It is certified that error appears in the above-identified patent and that said Letters Patent is hereby corrected as shown below:

<u>Column 10,</u>
Line 9, "both" should read -- (both --.

Signed and Sealed this

Second Day of December, 2003

JAMES E. ROGAN
*Director of the United States Patent and Trademark Office*